United States Patent
Steger

(10) Patent No.: US 11,571,865 B1
(45) Date of Patent: Feb. 7, 2023

(54) OVERMOLDED ELECTRONIC EYEWEAR DEVICE FRAME

(71) Applicant: Stephen Steger, Los Angeles, CA (US)

(72) Inventor: Stephen Steger, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 167 days.

(21) Appl. No.: 16/832,036

(22) Filed: Mar. 27, 2020

(51) Int. Cl.
| | |
|---|---|
| *B29D 12/02* | (2006.01) |
| *G02C 11/00* | (2006.01) |
| *B29C 33/44* | (2006.01) |
| *B29C 45/14* | (2006.01) |
| *B29L 12/00* | (2006.01) |
| *B29C 45/03* | (2006.01) |

(52) U.S. Cl.
CPC .............. *B29D 12/02* (2013.01); *B29C 33/44* (2013.01); *B29C 45/14065* (2013.01); *B29C 45/14073* (2013.01); *B29C 45/14819* (2013.01); *G02C 11/10* (2013.01); *B29C 45/03* (2013.01); *B29L 2012/005* (2013.01)

(58) Field of Classification Search
None
See application file for complete search history.

(56) References Cited

U.S. PATENT DOCUMENTS

| 4,955,706 A | * | 9/1990 | Schmidthaler | ........... G02C 5/00 351/41 |
| 2010/0328603 A1 | * | 12/2010 | Liguori | ................. G02C 1/023 351/159.73 |
| 2012/0262667 A1 | * | 10/2012 | Willey | ................... G02C 5/146 351/158 |

* cited by examiner

*Primary Examiner* — Timothy Kennedy
*Assistant Examiner* — Olukorede Esan
(74) *Attorney, Agent, or Firm* — Culhane Meadows PLLC; Stephen J. Weeds

(57) ABSTRACT

A process of overmolding a frame of a portable eyewear electronic device and a frame produced by the process is presented. A frame that includes a first material and includes a releasably mountable feature is attached to the mold in a desired position and does not contact other areas of the mold. The mold is filled with a second material to at least partially encase the frame insert.

18 Claims, 6 Drawing Sheets

OVERMOLDED ELECTRONIC EYEWEAR DEVICE FRAME

TECHNICAL FIELD

Examples set forth in the present disclosure relate to portable electronic devices, including wearable electronic devices such as eyeglasses. More particularly, but not by way of limitation, the present disclosure describes a method of overmolding an electronic eyewear device.

BACKGROUND

Many electronic devices available today include wearable consumer electronic devices. Wearable consumer electronic devices have molded parts. Molding methods are used to form the molded parts.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
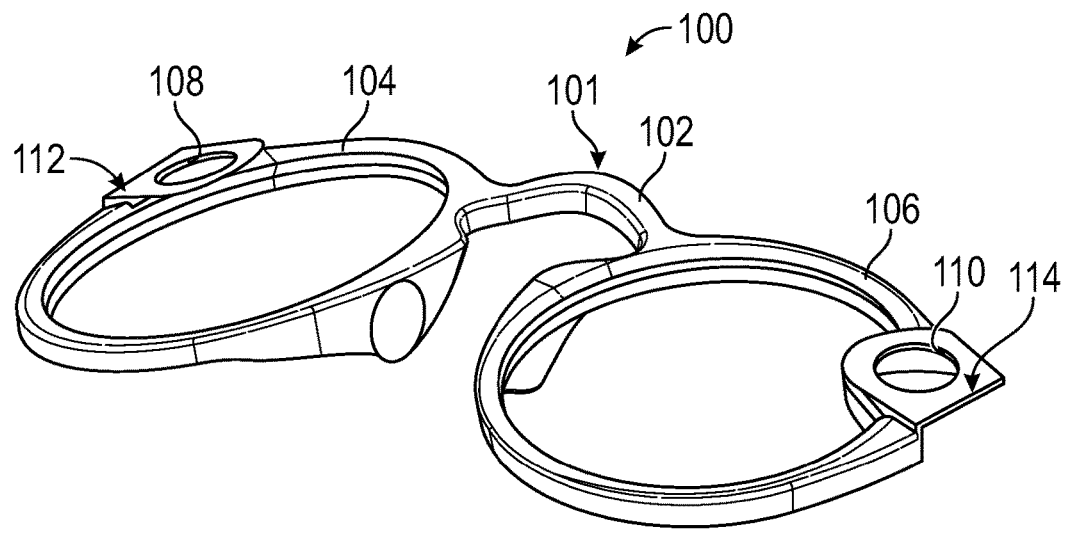
FIG. 1 is a perspective view of a frame insert for an electronic eyewear device in accordance with an example.

A process of overmolding a frame of a portable eyewear electronic device and a frame produced by the process is presented. A frame that includes a first material and includes a releasably mountable feature is attached to the mold in a desired position and does not contact other areas of the mold. The mold is filled with a second material to at least partially encase the frame insert.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "connect", "connected", "couple" and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Frames for electronic eyewear device are typically made using an injection molding process that tends to have some drawbacks such as sink marks resulting from uneven wall thicknesses, moreover, electronic eyewear devices also may benefit from additional electronics to be placed inside the frame insert but difficulties with integrating them in the molding process increases cycle time and depending on the material used may require temperatures detrimental to the integrity of the component.

Figure 2:
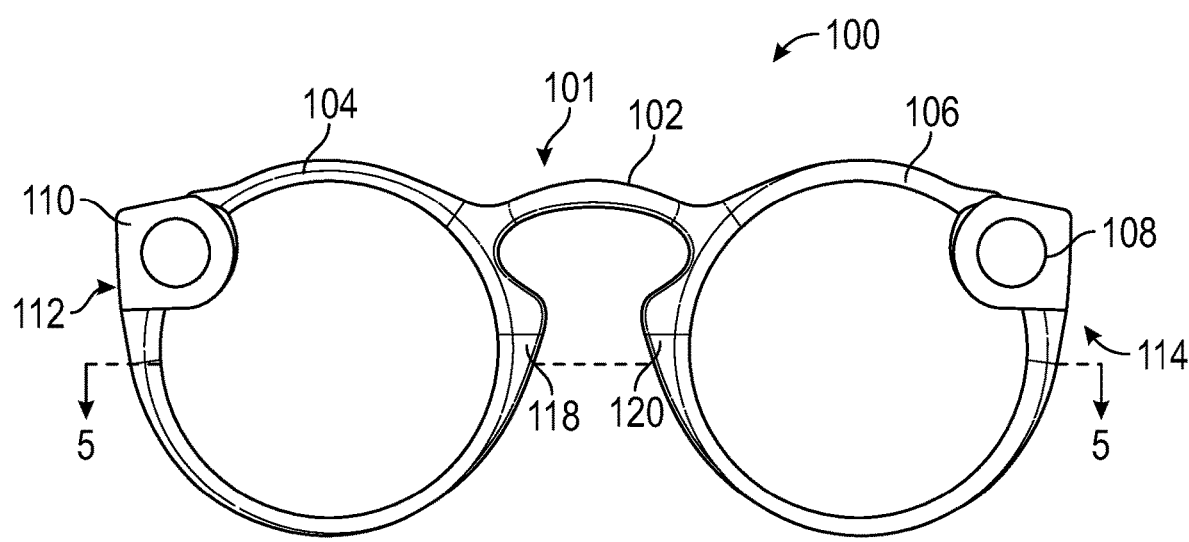
FIG. 2 is a front view of the frame insert of FIG. 1.
Figure 3:
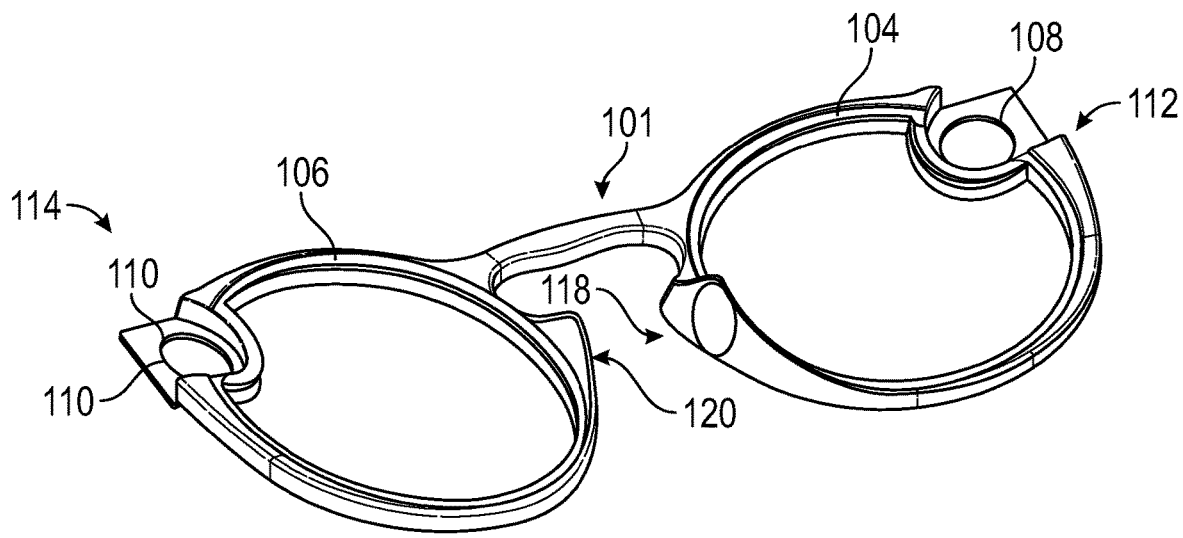
FIG. 3 is a back perspective view of the insert of FIGS. 1 and 2.

FIG. 1 is a perspective view and FIG. 2 is a front view of a frame insert 100 for an example electronic eyewear device. The frame insert 100 for the electronic eyewear device includes a frame 101 that comprises a bridge 102 and right and left eye lens rims 104, 106, and in some examples such as shown in FIGS. 1 and 2, may also include right and left side circumferential openings 108, 110, which are shown in FIGS. 1 and 2 near the hinge areas 112, 114, for receiving camera mounts and are also near right and left chunks (not shown) that may house various electronic components of the camera system such as circuit boards, wiring, etc. FIG. 3 is a back perspective view of the insert of FIGS. 1 and 2 showing hinge areas 112, 114 in more detail along with right and left nose pad mounting surfaces 118, 120 in additional detail.

Figure 4:
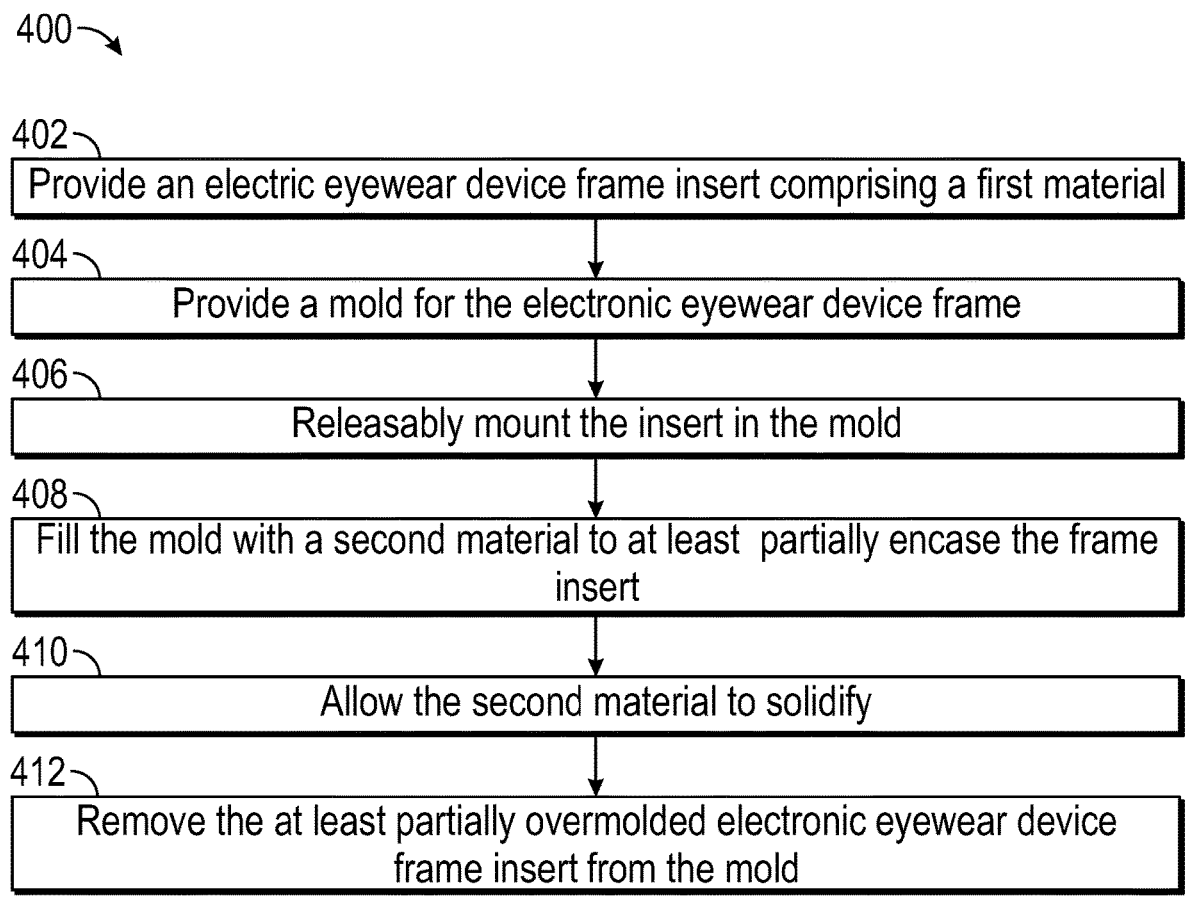
FIG. 4 is a flowchart that depicts an example overmolding process for a frame insert of an electronic eyewear device.

FIG. 4 is a flowchart that depicts the overmolding process for the frame insert 100. At step 402, an electronic eyewear device frame insert 100 that is composed of a first material 121. Materials that can be used in to create the described insert include various metals, thermoplastics, some thermosets, and some elastomers. The selection of a substrate material for creating the insert is based both upon the desired characteristics of the insert, such as the degree of rigidity or flexibility for fitting to a wearer's head, retention of the shape, and the processing parameters of the molding process. Different materials have different properties that affect the strength and function of the final part and also dictate the processing parameters, including the injection temperature, injection pressure, mold temperature, molten substrate viscosity, ejection temperature, and cycle time.

As mentioned above, thermoplastics are suitable for use. Thermoplastics become pliable or moldable above a specific temperature and return to a solid state upon cooling. Most thermoplastics have a high molecular weight and molecular chains that associate through intermolecular forces that will spontaneously reform upon cooling, allowing thermoplastic materials to be remolded. Another material that can be used in injection molding is a thermosetting polymer. Unlike thermoplastics, thermosetting polymers form irreversible chemical bonds during the curing process that break down upon melting and do not reform upon cooling. In some examples, the first material 121 is translucent and in others it is opaque.

In some examples, the frame insert 100 is made from a metal, metal alloy or metal composite composition or combination thereof, such as by molding, stamping, milling or other suitable process.

Another feature of the materials used for the insert 100 is the hardness of each material, which contributes to adjustability, strength and comfort. Shore Hardness is measured using a Durometer, the International Standard Instrument used to measure the hardness of rubber, rubber-like materials or plastics. Durometers measure hardness by the penetration of an indentor into the rubber/plastic sample. The calibrated reading is expressed in a number value. The hardness values are always expressed in terms of plus or minus (+/−) five points (example: 60+/−5 Durometer). There are 3 Durometer types and they relate to materials as Durometer type "A" is for the Shore Hardness of soft rubbers and plastics, Durometer type "D" is for the Shore Hardness of hard rubber and plastics and Durometer type "00" is for the Shore Hardness of sponges and foam. In one example, the first material 121 has a Shore D Hardness between about 80 and about 85. In one example, the first material 121 is a translucent thermoplastic polyamide produced by EMS-Chemie, having a hardness of between about 80 and about 85 Shore D. In some examples the first material 121 is made of a thermoplastic material such as nylon, such as the nylon material is manufactured by EMS-GRIVORY, a unit of EMS-CHEMIE AG, which is based in Switzerland and Sumter, S. C. A nylon material has stronger thermal and mechanical properties than many other materials used for sunglass manufacturing. This is helpful because eyeglasses and sunglasses can be subjected to extreme climate conditions ranging from approximately −20° C. to approximately 110° C. and need to be able to retain their shape.

Optionally, in some examples, the insert 100 may be modified to form a pre-assembled or modified insert to include one or more parts, including but not limited to a flexible printed circuit board (PCB), antenna, heatsink, or various other parts suitable for an electronic eyewear device, and in some other examples, such parts include one or more decorative features, designs, aspects, and the like. In some examples, insert 100 can itself could function as an antenna or heatsink.

Figure 5A:
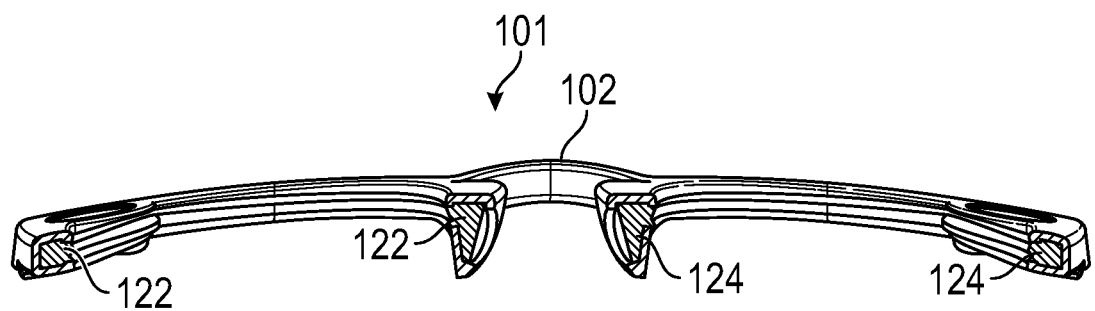
FIGS. 5A and 5B, which are bottom and perspective cross-sectional views taken along line 5-5 of FIG. 2
Figure 5B:
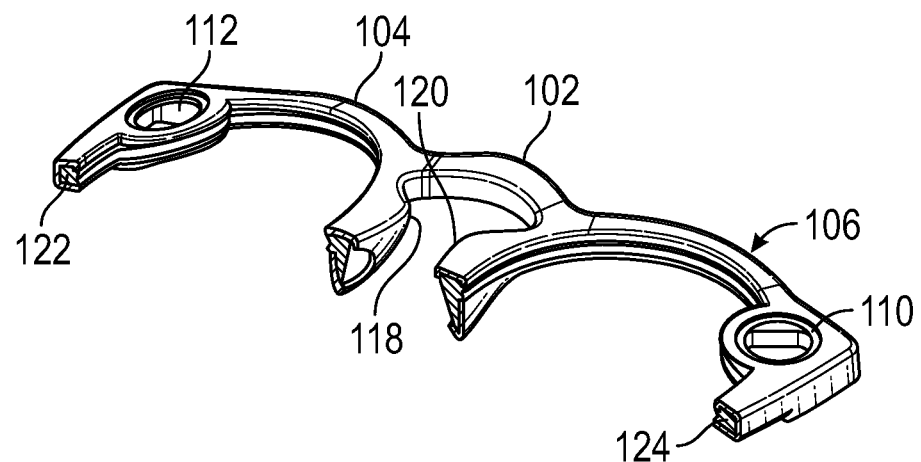
Figure 6A:
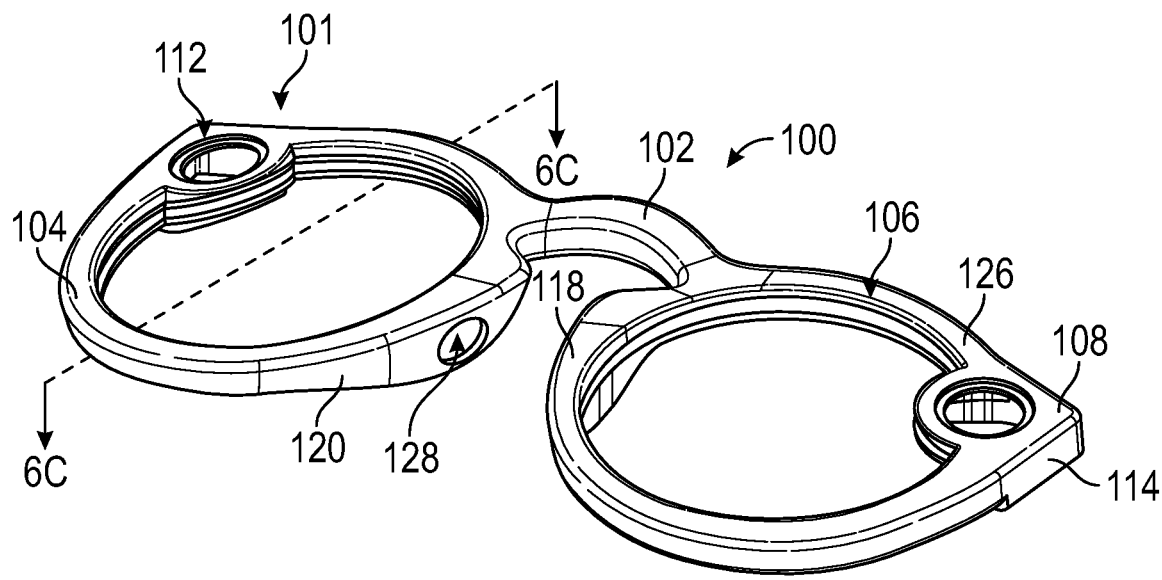
FIG. 6A is a front perspective view that depicts an overmolded frame insert of an electronic eyewear device produced in accordance with an example of an overmolding process described herein.
Figure 6B:
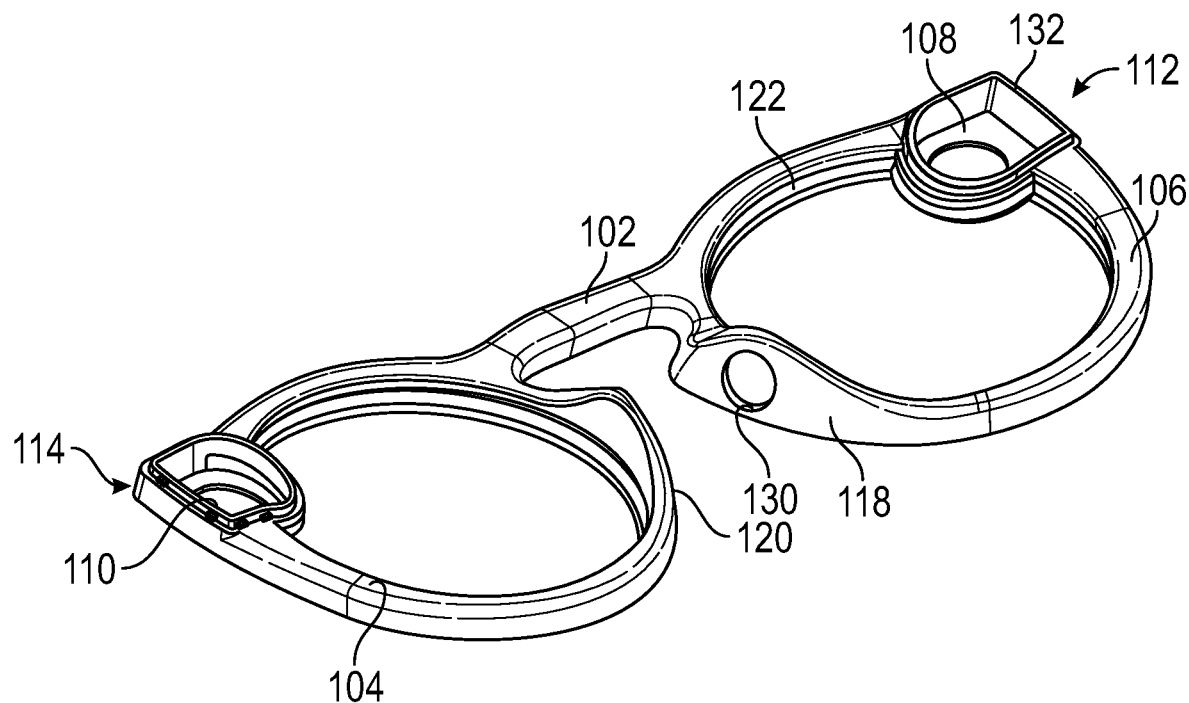
FIG. 6B is a back perspective view of the overmolded electronic eyewear device of FIG. 6A.
Figure 6C:
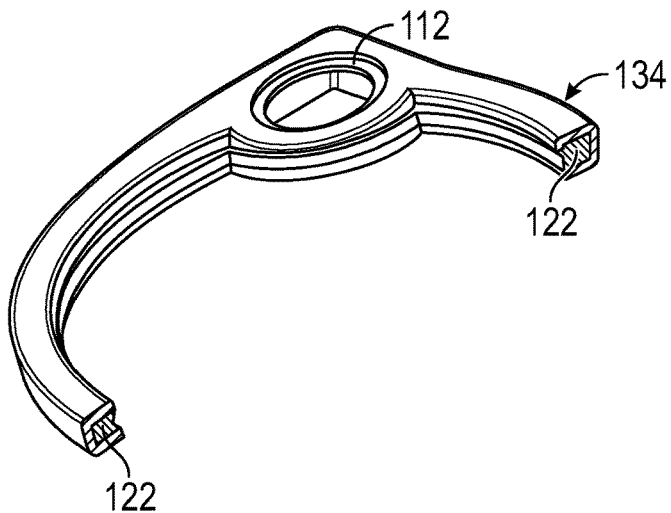
FIG. 6C is a perspective sectional view taken along line 6C-6C of FIG. 6A.

The frame insert 100 also includes one or more releasably mountable feature(s) that can be used as an attachment point(s) during the molding process. For example, as shown in FIGS. 5A and 5B, which are bottom and perspective cross-sectional views taken along line 5-5 of FIG. 2, an example eye lens rim configuration includes a V-shaped lens groove 122, 124, but similar undercut features that can be used to hold the insert while undergoing the overmolding process without interfering in coverage of the insert is also suitable. FIGS. 6A-6C also show the lens grooves 122, 124. In some examples, the nose pad areas 128, 130 of nose pad mounting surfaces 118, 120 as shown in FIGS. 1 and 2 can serve as points of contact to stabilize the insert in the mold.

At step 404, a mold is provided for the electronic eyewear device frame insert 100. The mold can be one suitable for overmolding. Either a horizontal or vertical injection molding machine can be used for the overmolding of the second material on the insert. In one example, a vertical injection molding machine is used to overmold the second material on the insert. In another example, a horizontal injection molding machine is used to overmold the second material on the insert.

At steps 406 and 408, the frame insert is placed into the mold and releasably mounted in a desired position and not contact other areas of the mold. In one example, the eye lens rim configuration provides a releasably mountable feature for releasable attachment to the mold which does not interfere with overmolding of the remaining insert. In another example, the camera mount openings can also be used in addition to, or instead of the eye lens rims depending on their dimensions and support capability for the insert.

At step 410, after the insert is releasably attached to the mold, the mold is filled with a second material in an amount sufficient to cover the insert to a desired thickness. In one example, the insert part is designed to minimize wall thickness variation in the overmold second material for a desired appearance, making the initial appearance, which typically includes sink marks and other surface irregularities and blemishes, of the insert less important.

In one example, the first material, and the overmolded second material, have different Shore Hardness or are made from different materials, or both. In one example, the first material 121 is a harder material with a Shore D Hardness between 80 and 85 and the second material is a softer material with a Shore A Hardness between 60 and 70. In some examples, the first material 121 and second material have substantially the same Shore Hardness. In another example, the first material 121 is a translucent thermoplastic polyamide produced by EMS-Chemie, having a hardness of between 80 and 85 Shore D and the second material having a hardness of between 60 and 70 Shore A. In yet another example, the second material is a rubber. In some examples, the second material is a silicone rubber. In one example, the second material has a hardness of between 60 and 70 Shore A.

In some examples, colorants are added to the first material, added to the second material, added to both, or added to neither to alter the color and overall appeal of the electronic eyewear device overmolded frame.

At step 412, the second material at least partially encasing the frame insert is allowed to solidify. In some examples, the second material does not exceed 90% of the surface area of the insert and could cover as little as 5% of the area of the insert.

At step 414, the overmolded electronic eyewear device frame insert is removed from the mold. FIGS. 6A-6C show examples of overmolded frame inserts produced by the described method. FIG. 6A is a front perspective view of an overmolded electronic eyewear device frame insert such that the second material 126 encases the front of the frame 101, except for right and left lens grooves 122, 124, the innermost circumferential areas of the camera housing and nose-facing portions 128, 130 of the nose pads. In this example, the second material 126 is an opaque material.

FIG. 6B is a back perspective view of the overmolded electronic eyewear device of FIG. 6A showing build-up 132 of the second material 126 on the area surrounding the camera circumferential opening 108 and follows the perimeter of chunks for the device and also shows the lack of encasement of an area 130 of nose pad mounting surface 118 as shown in FIG. 6A. FIG. 6C is a perspective sectional view taken along line 6C-6C of FIG. 6A, which shows releasable mountable feature or attachment point or groove 122.

Figure 7A:
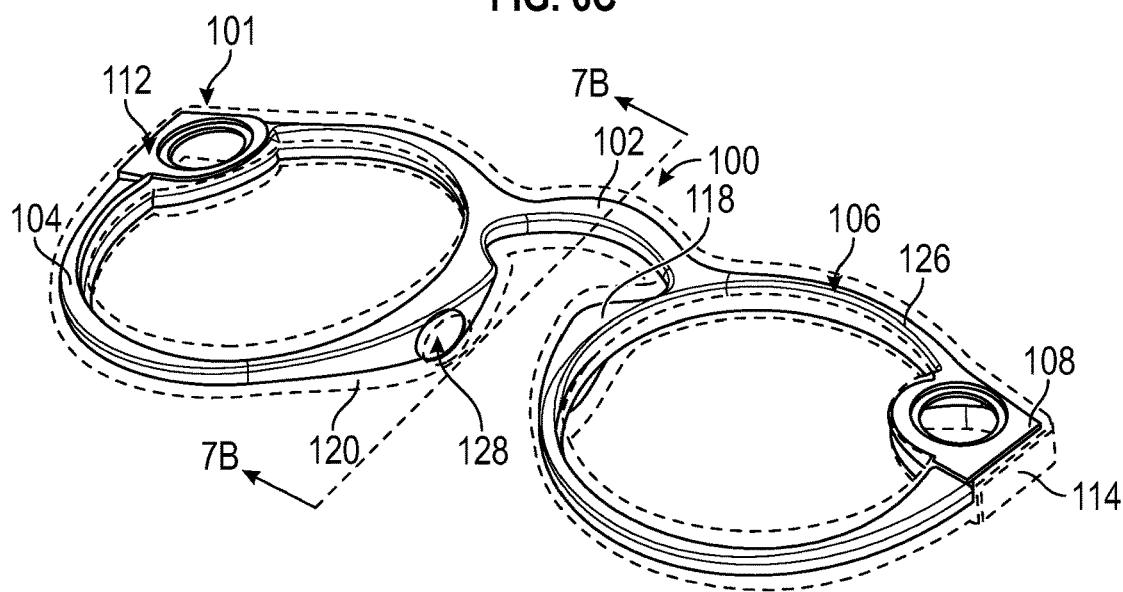
FIG. 7A is a front perspective view that depicts an overmolded frame insert of an electronic eyewear device produced in accordance with an example of an overmolding process described herein.
Figure 7B:
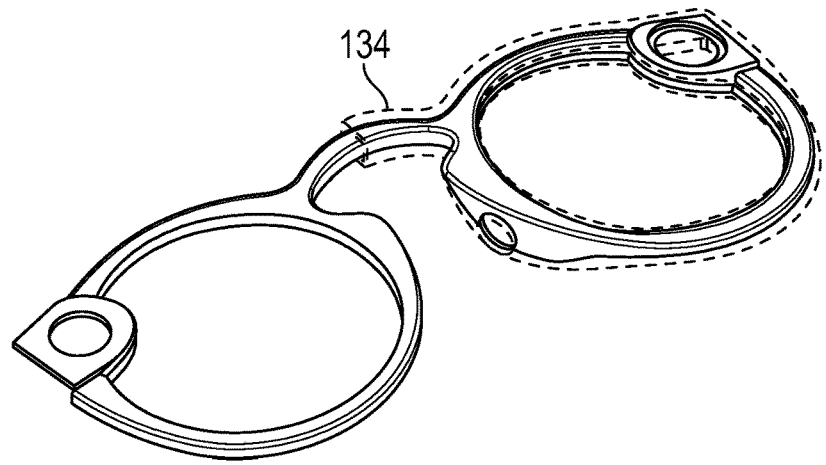
FIG. 7B is a partial cut away view taken along line 7B-7B of FIG. 7A showing additional detail.

FIG. 7A is a front perspective view that provides an example of an insert that has been encased in a translucent second material 126 and FIG. 7B is a partial cut away view showing how the second material 126 exhibits a substantially consistent wall thickness 134 while concealing imperfections in the surface of the overmolded insert.

Figure 8A:
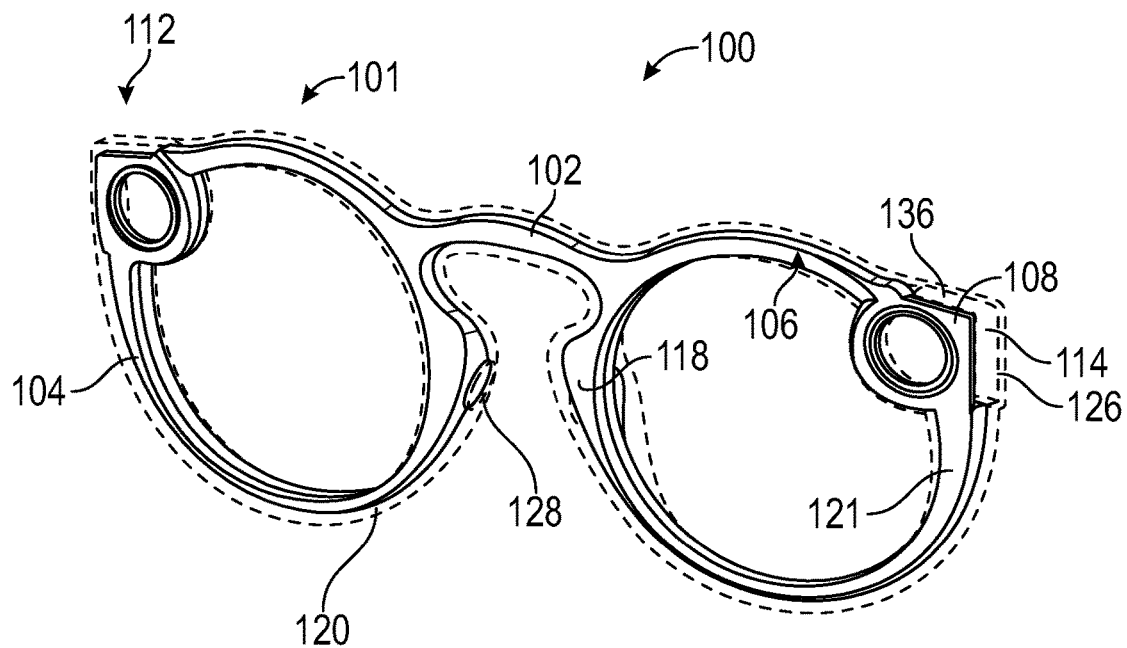
FIG. 8A is a front perspective view that depicts an overmolded frame insert of an electronic eyewear device produced in accordance with an example of an overmolding process described herein.
Figure 8B:
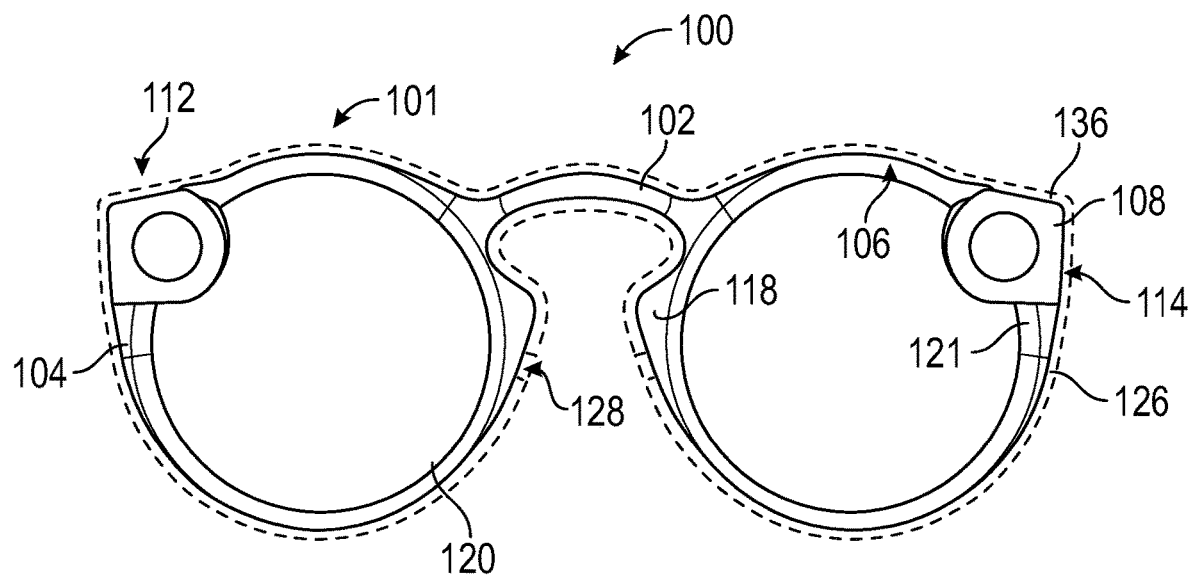
FIG. 8B is a front elevation view of the overmolded frame insert of an electronic eyewear device shown in FIG. 8A.

FIGS. 8A and 8B are a front perspective view and a front elevation view showing an electronic eyewear device frame insert where the first material 121 may be opaque and/or decorated and is partially encased with the second material 126. In this example, the second material 126 encases (as used herein "encases" includes covers or bonds to) the outer perimeter 136 of the frame and rims to provide a two-tone visual impression. In some examples, the second material may cover less than 10% of the surface area of frame insert 100. In other examples, the second material may cover less than 10%, 15%, 20%, 30%, 40%, 50%, 60%, 70%, 80%, 90%, or 95% of the surface area of frame insert 100 In some examples, a third material could be subsequently overmolded to form a "second overmolded" frame insert.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A process, comprising:
   providing an electronic eyewear device frame insert composed of a first material;
   providing a mold for the electronic eyewear device frame insert, wherein the electronic eyewear device frame insert comprises a releasably mountable feature for releasable attachment to the mold which does not interfere with overmolding of areas of the electronic eyewear device frame insert not comprising the releasably mountable feature, wherein the releasably mountable feature includes at least one eye lens rim;
   inserting the electronic eyewear device frame insert into the mold and releasably mounting the at least one eye lens rim of the electronic eyewear device frame insert to the mold in a desired position and not contacting other areas of the mold;
   filling the mold with a second material in an amount sufficient to cover the electronic eyewear device frame insert to a desired coating thickness;
   allowing the second material containing the electronic eyewear device frame insert to solidify; and
   removing from the mold an overmolded electronic eyewear device having the electronic eyewear device frame insert partially encased with the second material to produce an overmolded electronic eyewear device.

2. The process of claim 1, further comprising assembling one or more parts to the electronic eyewear device frame insert prior to inserting the electronic eyewear device frame insert into the mold.

3. The process of claim 2, wherein the one or more parts include a flexible printed circuit board (PCB) or antenna.

4. The process of claim 2, wherein the one or more parts includes a decorative feature.

5. The process of claim 1, wherein the first material has a Shore Hardness that is substantially identical to the second material.

6. The process of claim 1, wherein the second material is different from the first material.

7. The process of claim 6, wherein the second material has a lower Shore Hardness than the first material.

8. A process according to claim 7, wherein the first material has a Shore D Hardness of between about 80 to about 85 and the second material has a Shore A hardness of between about 60 to about 70.

9. The process of claim 7, wherein the second material is a rubber material.

10. The process of claim 1, wherein the first material comprises a thermoplastic.

11. The process of claim 1, wherein the first material is transparent.

12. The process of claim 1, wherein the first material is a metal or metal composite.

13. The process of claim 1, wherein the at least one eye lens rim comprises a groove.

14. The process of claim 1, wherein the mold is a horizontal injection molding machine.

15. An overmolded electronic eyewear device produced by the process of claim 1.

16. The overmolded electronic eyewear device of claim 15, wherein the overmolded electronic eyewear device comprises one or more parts at least partially encased within the overmolded layer.

17. The overmolded electronic eyewear device of claim 15, wherein the second material has a lower Shore Hardness than the first material.

18. The overmolded electronic eyewear device of claim 17, wherein the first material has a Shore D Hardness of between about 80 to about 85 and the second material has a Shore A hardness of between about 60 to about 70.

* * * * *